US012326217B2

(12) United States Patent
Carroll et al.

(10) Patent No.: US 12,326,217 B2
(45) Date of Patent: Jun. 10, 2025

(54) SELF-DEPLOYING STAND FOOT (71) Applicant: Hewlett-Packard Development Company, L.P., Spring, TX (US)

(72) Inventors: Benjamin Carroll, London (GB); John William Pennington, Jr., Palo Alto, CA (US); Marcus Hoggarth, London (GB); Stephen Philip de Saulles, London (GB); Michael Brown, London (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 51 days.

(21) Appl. No.: 18/528,184

(22) Filed: Dec. 4, 2023

(65) Prior Publication Data
US 2025/0109820 A1 Apr. 3, 2025

Related U.S. Application Data (60) Provisional application No. 63/586,951, filed on Sep. 29, 2023.

(51) Int. Cl.
*F16M 13/00* (2006.01)
(52) U.S. Cl.
CPC ....... *F16M 13/005* (2013.01); *F16M 2200/08* (2013.01)
(58) Field of Classification Search
CPC .......................... F16M 13/005; F16M 2200/08

USPC ................ 248/127, 346.01, 346.04, 917; 361/679.21
See application file for complete search history.

(56) References Cited

U.S. PATENT DOCUMENTS

| | | | | |
|---|---|---|---|---|
| 8,000,092 B2 * | 8/2011 | Kim | ........................ | F16M 11/22 361/679.21 |
| 8,390,996 B2 * | 3/2013 | Park | ........................ | F16M 11/10 248/917 |
| 8,654,526 B2 * | 2/2014 | Wu | ........................ | F16M 11/10 361/679.55 |
| 9,829,069 B2 * | 11/2017 | Park | ........................ | G09F 9/301 |
| 10,154,227 B2 * | 12/2018 | Ikemoto | ............... | H05K 5/0204 |
| 11,347,267 B2 * | 5/2022 | Wolff | .................... | G06F 1/1652 |
| 2008/0186661 A1 * | 8/2008 | Hsu | ........................ | F16M 13/02 361/679.01 |

* cited by examiner

*Primary Examiner* — Todd M Epps
(74) *Attorney, Agent, or Firm* — Quarles & Brady LLP (57) ABSTRACT

The present disclosure provides a portable electronic device including a frame body supporting electronic components and a stand mechanism. The stand mechanism includes a foot, and an activator. The foot includes a foot support and a foot shaft including a foot guide path. The activator includes an engaging element, and the engaging element is received by the foot guide path. A portion of the foot guide path extends at an angle relative to a longitudinal axis of the foot shaft. When the activator engages a surface, the engaging element of the activator moves along the portion of the foot guide path at the angle relative to the longitudinal axis of the foot shaft causing the foot support to rotate from a stored position to a deployed position.

20 Claims, 7 Drawing Sheets

SELF-DEPLOYING STAND FOOT

CROSS REFERENCE TO RELATED APPLICATION

The present application claims priority to U.S. Provisional Patent Application No. 63/586,951, filed Sep. 29, 2023, the entire contents of which is herein incorporated by reference as if fully set forth in this description

BACKGROUND

Stands for electronic devices, such as stands for display devices, enable a user to level a display on various surfaces (e.g., flat surfaces or uneven surfaces). For example, a user may install a stand to position an electronic display at a desired location. In some examples, the stand may include legs, which provide enhanced stability to level the electronic display on uneven surfaces. In some examples, a user may modify the configuration of the stand when the electronic display is transported between different locations.

BRIEF DESCRIPTION OF THE DRAWINGS

The following drawings are provided to help illustrate various features of examples of the disclosure and are not intended to limit the scope of the disclosure or exclude alternative implementations.

DETAILED DESCRIPTION OF THE PRESENT DISCLOSURE

The disclosed technology is not limited in its application to the details of construction and the arrangement of components set forth in the following description or illustrated in the following drawings. Other examples of the disclosed technology are possible, and examples described and/or illustrated here are capable of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following detailed description is to be read with reference to the figures, in which like elements in different figures have like reference numerals. The figures, which are not necessarily to scale, depict selected examples and are not intended to limit the scope of examples of the disclosure.

In some examples, the technology disclosed herein provides a portable electronic device including a frame body supporting electronic components and a stand mechanism. The stand mechanism includes a foot, and an activator. The foot includes a foot support and a foot shaft including a foot guide path. The activator includes an engaging element, and the engaging element is received by the foot guide path. A portion of the foot guide path extends at an angle relative to a longitudinal axis of the foot shaft. When the activator engages a surface, the engaging element of the activator moves along the portion of the foot guide path at the angle relative to the longitudinal axis of the foot shaft causing the foot support to rotate transversely from a stored position to a deployed position.

In some examples, the technology disclosed herein provides a stand mechanism including a pair of holders, a pair of feet, and a pair of activators. The pair of feet each includes a foot guide path, and the foot guide path includes a first cutout portion, a second cutout portion, and a third cutout portion. The pair of activators each includes a biasing member and an engagement element. When at least one of the pair of activators engages a surface, the respective engagement element of the respective activator moves from the third cutout portion toward the first cutout portion. When the at least one of the pair of activators disengages with the surface, the respective biasing member biases the respective activator by moving the respective engagement element from the first cutout portion toward the third cutout portion. The movement from the first cutout portion to the third cutout portion along the second cutout portion causes the respective foot to move between a stored position and a deployed position The pair of holders each includes a holder guide path. The pair of feet each includes a foot guide path. The foot guide path includes a first cutout portion, a second cutout portion, and a third cutout portion. The pair of activators each includes an engagement element. When at least one of the pair of activators engages a surface, the engagement element moves from the third cutout portion toward the first cutout portion along the second cutout portion deploying at least one of the pair of feet. When the at least one of the pair of activators disengages with the surface, the pair of biasing members pushes the pair of activators by moving the engagement element moves from the first cutout portion toward the third cutout portion along the second cutout retracting the at least one of the pair of feet.

In some examples, the technology disclosed herein provides a portable electronic device. The portable electronic device includes a stand mechanism. The standing mechanism includes a holder, a self-deployable foot, and an activator. The holder includes vertical cutouts. The self-deployable foot includes a foot support and at least one cam cutout. The activator includes an engaging element and the engaging element received by the vertical guide path and the at least one cam cutout. When the activator is engaged with a surface, the activator compresses a biasing member causing the engagement element to move toward a first end of the holder. The foot support is in a deployed position when the engaging element is at the upper end of the holder. When the activator is disengaged from the surface, the biasing member biases the activator causing the engaging element to be positioned toward a second end of the holder. The foot support is in a retracted position when the engaging element is at the lower end of the holder.

Figure 1:
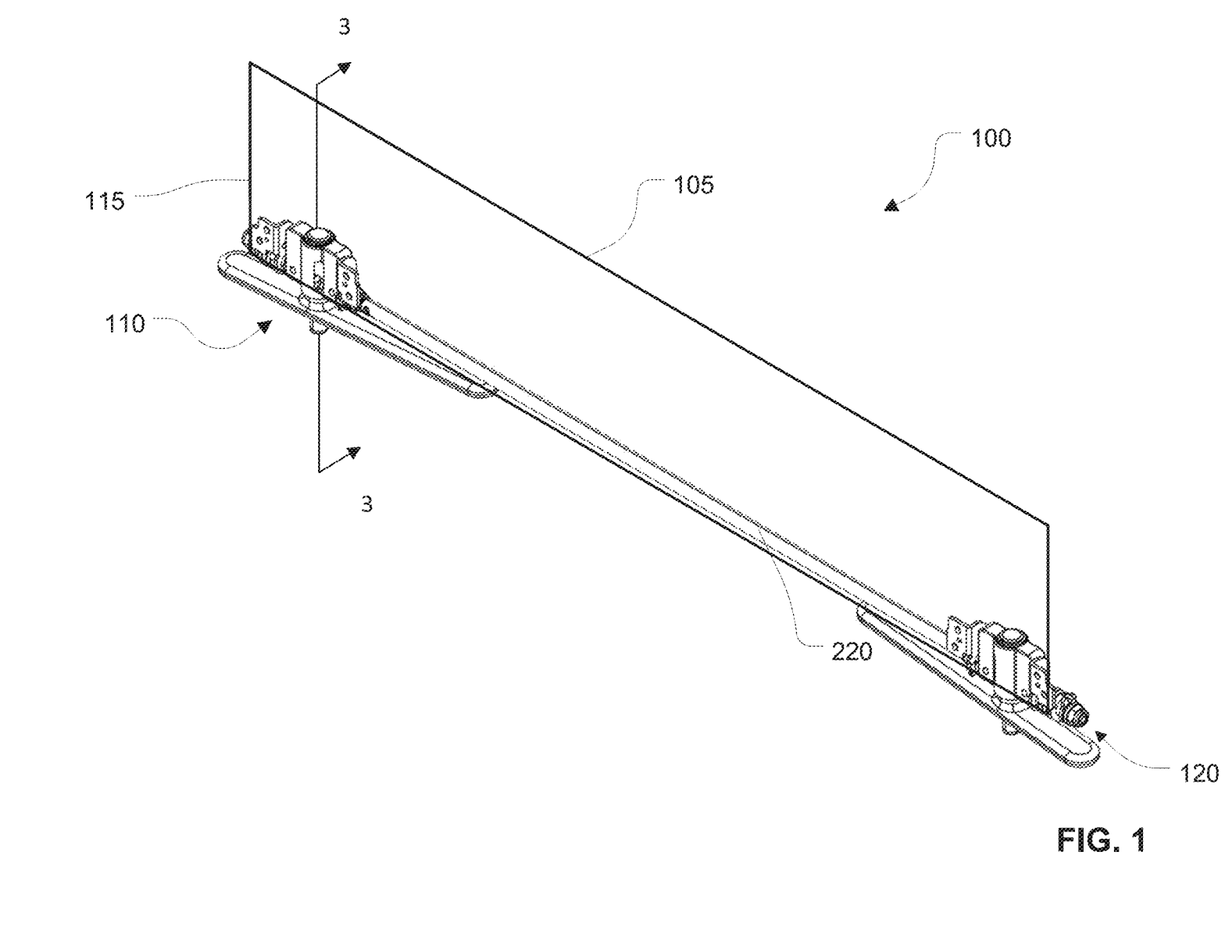
FIG. 1 is a perspective view of a self-deployable stand feet according to aspects of the present disclosure.

FIG. 1 illustrates a portable electronic device 100. The portable electronic device 100 includes an electronic component 105 and a stand mechanism 110. Example electronic component may include computers such as all-in-one computers, laptops, tablets, mobile devices, radios, imaging devices, and/or display devices. The electronic component 105 may include a frame body 115 and the frame body 115 may have one or more mounting structures (not shown). In one example, the stand mechanism 110 may be disposed along a horizontal direction (e.g., landscape orientation) of the frame body 115. Alternatively, in another example, the stand mechanism 110 may be disposed along a vertical direction (e.g., portrait orientation) of the frame body 115. In the illustrated example, the electronic device 100 includes a pair of feet. However, in some other examples, the electronic device 100 may include a different number of feet, such as a single foot or more than two feet (e.g., three feet or four feet).

Figure 2:
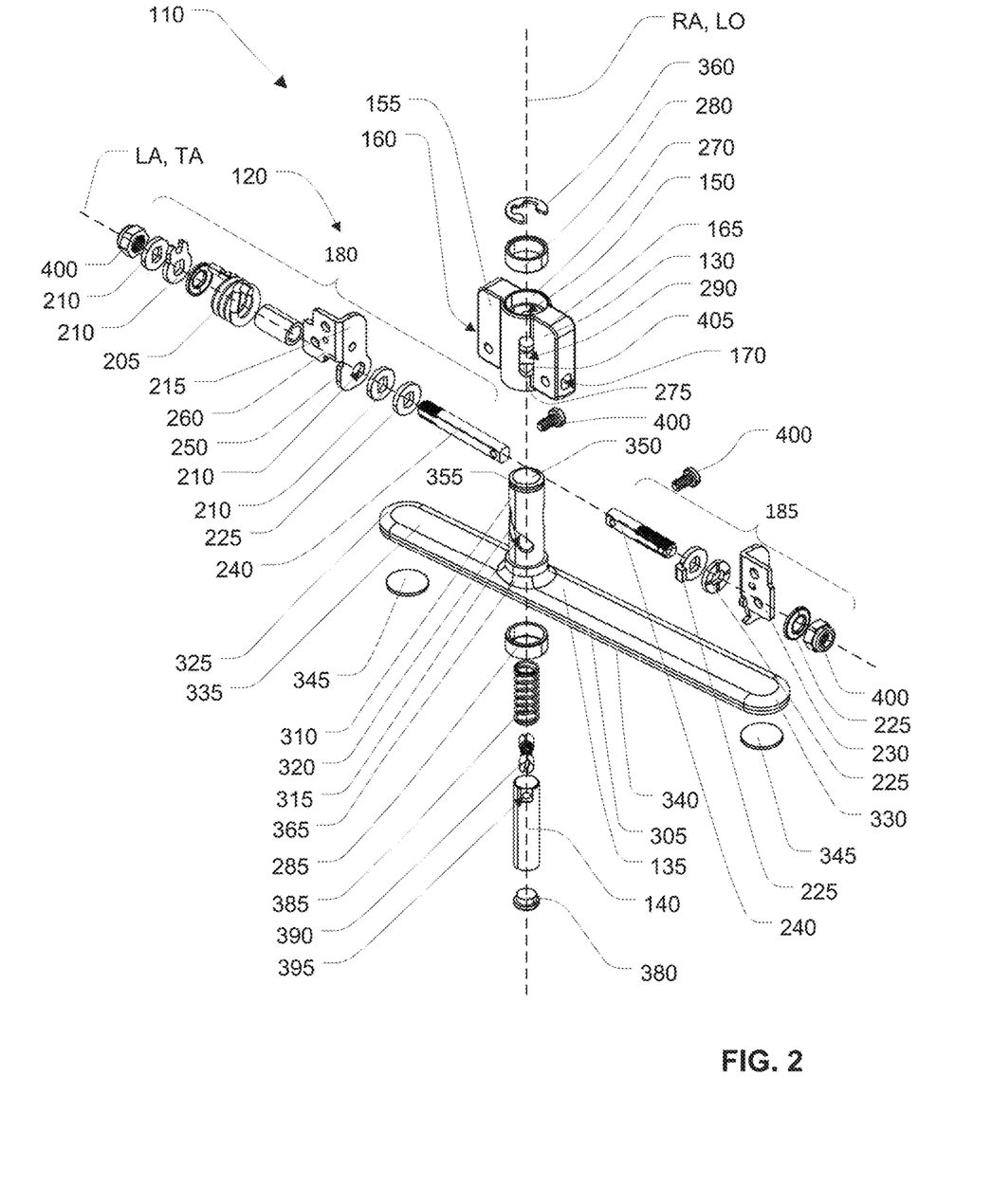
FIG. 2 is an exploded view of the self-deployable stand foot of FIG. 1.

In some examples, the frame body 115 of the portable electronic device 100 may be coupled a standing mechanism 110 that includes various components. FIG. 2 illustrates various components of the stand mechanism 110 including a tilt assembly 120. The stand mechanism 110 includes a holder 130, a foot 135, and an activator 140. The holder 130 includes a holder bore 150 that defines a rotational axis RA. The holder 130 includes a first side bracket 155 including a first mount hole 160 and a second side bracket 165 including a second mount hole 170. The first mount hole 160 and the second mount hole 170 are axially aligned about a tilt axis TA that is disposed perpendicular to the rotational axis RA. In some examples, the standing mechanism 110 of the portable electronic device 100 may not include every single component discussed above. For example, the standing mechanism 110 may operate without a tilt assembly 120 by moving from a stored position and a deployed position. Additionally, the holder 130 of the standing mechanism may include different type of mounting system (e.g., a ball-socket mount).

The tilt assembly 120 includes a first tilt portion 180 and a second tilt portion 185. The first tilt portion 180 includes a tilt spring 205, tilt rings 210, and a first mounting bracket 215 and the second tilt portion 185 includes a torsion rod 220 (not shown, see FIG. 1 or FIG. 3), tilt rings 225 and a second mounting bracket 230. The first tilt portion 180 and the second tilt portion 185 are securely coupled to the respective mount holes (e.g., first tilt portion 180 is securely coupled to the first mount hole 160 and the second tilt portion 185 is securely coupled to the second mount hole 170) of the holder 130 by a mounting rod 240. In some examples, the first tilt portion 180 is disposed opposite of the second tilt portion 185. The tilt spring 205 of the first tilt portion 180 and the torsion rod 220 of the second tilt portion 185 allows the frame body 115 to tilt forward and backward.

In the illustrated example, each of the first and second mounting brackets 215, 230 includes a base panel 250 extending perpendicular to the tilt axis TA. The base panel 250 includes an aperture 255 at one end of the base panel 250 and a wing panel 260 extending perpendicular to the base panel 250 opposite the aperture 255. The first tilt portion 180 including the tilt spring 205, tilt rings 210, and the aperture 255 of the first mounting bracket 215 are aligned about a lateral axis LA and are received by the mounting rod 240. The second tilt portion 185 including the torsion rod 220, tilt rings 225 and the aperture 255 of the second mounting bracket 230 are aligned about the lateral axis LA and are received by the mounting rod 240.

As shown in FIG. 2, the holder 130 includes a first counterbore 270 and a second counterbore 275 that is concentric with the holder bore 150. The first counterbore 270 receives an upper bushing 280 and the second counterbore 275 receives a lower bushing 285. Furthermore, the holder 130 includes a holder guide path 290 that is in communication with the holder bore 150. The holder 130 can be manufactured from a plastic material and/or from a metallic material. In some examples, the holder 130 can be additively manufactured using a 3D printer. In some examples, the holder 130 can be injection molded.

Continuing with FIG. 2, the foot 135 includes a foot support 305, a foot shaft 310, a foot shaft bore 315, and a foot guide path 320. The foot support 305 includes a first end 325 and a second end 330 that is opposite of the first end 325. In some examples, the foot shaft 310 can be disposed closer to one end of the foot support 305 according to the location of the center of gravity of the portable electronic device 100. Alternatively, in some examples, the foot shaft 310 can be disposed equidistant from both the first end 325 and the second end 330 of the foot support 305 according to the location of center of gravity of the portable electronic device 100. The foot support 305 and the foot shaft 310 can be manufactured from plastic material and/or metallic material from additive manufacturing and/or injection molding. In some examples, the foot support 305 and the foot shaft 310 can be formed integrally as a single component. Alternatively, the foot support 305 and the foot shaft 310 can be formed as individual parts and can be assembled and/or adhered together to form the foot 135.

In the illustrated example, the foot shaft 310 is disposed closer to the first end 325 of the foot support 305 and the foot shaft 310 extend normal to an upper surface 335 of the foot support 305. A bottom surface 340 of the foot support 305 includes foot pads 345 and are disposed adjacent to the first end 325 and the second end 330 of the foot support 305. The foot pads 345 can be formed from an elastomeric material to provide friction and stability while the foot 135 is in contact with a working surface.

As shown in FIG. 2, the foot shaft 310 includes a distal end 350 and a groove 355 that is adjacent to the distal end 350. The groove 355 receives a clip ring 360. The clip ring 360 can be manufactured from a plastic material and/or a metallic material. The foot shaft bore 315 extends between the distal end 350 and a base 365 of the foot shaft 310. The foot guide path 320 extends between the distal end 350 and the base 365 of the foot shaft 310. The foot guide path 320 is in communication with the foot shaft bore 315.

As shown in FIG. 2, the activator 140 includes an activator pad 380 that is disposed at an opposite end of a biasing member 385. As used herein, the term biasing member refers to spring-based elements such as a leaf spring or a spring plate, gas canisters, or any element capable of recovering size and shape after a deformation, for example, a deformation caused by the process transmitted forces. The activator pad 380 can be manufactured from elastomeric materials similar to the foot pads 345. The biasing member 385 can be manufactured from be rubber, flexible material, or metal (e.g., steel). In the illustrated example, the biasing member 385 is a spring. The activator 140 includes an engaging element 390 that is received through an aperture 395 that extends perpendicular to the longitudinal axis LO. The engaging element 390 can be a pin or a guide screw. In some examples, the engaging element 390 is received by the foot guide path 320 and the holder guide path 290. In some examples, the stand mechanism 110 can be mounted on various electronic component 105 without the tilt assembly 120. For example, the electronic component 105 may include a knuckle joint that can be manually tightened to a desired position by an end user.

Figure 3:
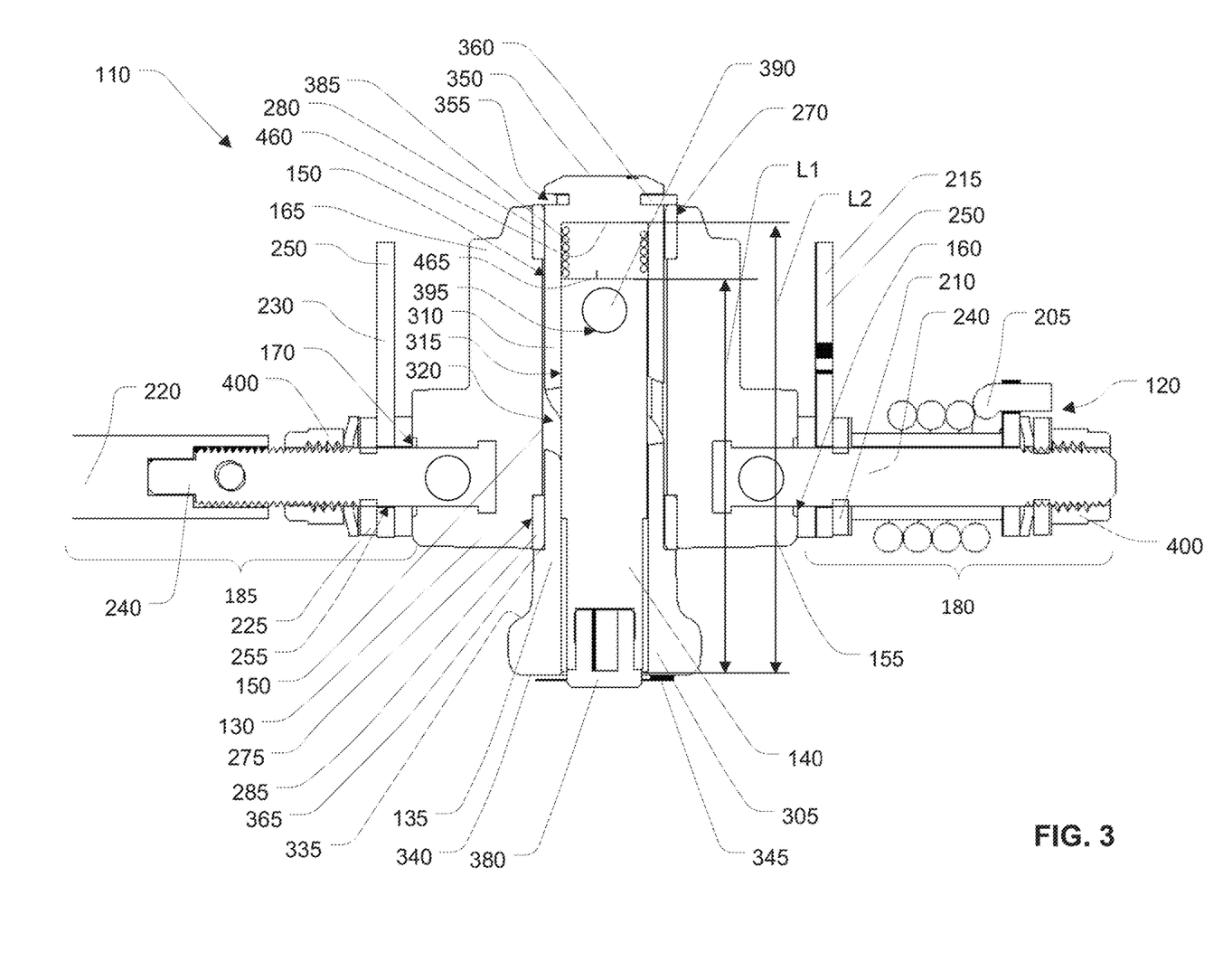
FIG. 3 is a cross-sectional view of the self-deployable stand foot of FIG. 1 taken along line 3-3.

FIG. 3 illustrates an assembled stand mechanism 110 and the tilt assembly 120 . . . . In the illustrated example, the first and second tilt portions 180, 185 of the tilt assembly 120 are securely coupled to the holder 130 by a fastening mechanism 400 (e.g., bolts, nuts, washers). The mounting rod 240 includes a threaded end that receives a nut to contain various elements of the first tilt portion 180 and includes a fixed end that is opposite of the threaded end. The fixed end securely couples the mounting rod 240 to the first mount hole 160 adjacent to the first side bracket 155. Similarly, various elements of the second tilt portion 185 (e.g., the torsion rod 220, tilt rings 225, and the aperture 255 of the second mounting bracket 230) are aligned about the lateral axis LA (as shown in FIG. 2) and are received by the mounting rod 240. The threaded end in conjunction with the nut enables the mounting rod 240 to contain various elements of the second tilt portion 185. The fixed end securely couples the mounting rod 240 to the second mount hole 170 adjacent to the second side bracket 165. As such, one end of each of the first and second mounting brackets 215, 230 is coupled to the stand mechanism 110 and the other end is coupled to the frame body 115. In some examples, the stand mechanism 110 can be used without the tilt assembly 120.

As shown in FIG. 3, the engaging element 390 is received by the aperture 395 that extends perpendicular to a length L1 of the activator 140 and is disposed adjacent to the biasing member 385. In the illustrated example, the biasing member 385 is positioned within the foot shaft bore 315 and above the activator 140 and the engaging element 390. In some examples, the aperture 395 may include threading to receive the engaging element 390 with threaded ends. In some examples, the length of the activator L1 can be longer than a length L2 of the foot shaft bore 315 to prevent jamming of the activator 140 within the foot shaft bore 315. The jamming of the activator 140 can result in partial deployment of the foot support 305.

As shown in FIG. 3, the holder 130 includes at least one bushing that receives the foot shaft 310, and the foot shaft 310 rotates within the at least one bushing. In the illustrated example, the holder bore 150 of the holder 130 extends between the first counterbore 270 that receives the upper bushing 280 and the second counterbore 275 that receives the lower bushing 285. The foot shaft 310 of the foot 135 is received by the holder bore 150 between the upper bushing 280 and the lower bushing 285. In some examples, the foot shaft 310 and the bushings 280, 285 establish a rigid connection to prevent and/or eliminate wobbling of the portable electronic device 100. For example, the rigid connections created by the bushings 280, 285 prevent unwanted shaking for portable electronic devices 100 with touch screens. As shown in FIG. 3, the distal end 350 and the groove 355 of the foot shaft 310 extend above the upper bushing 280. The clip ring 360 is inserted into the groove 355 of the foot shaft 310 to securely couple the foot shaft 310 to the holder 130.

Figure 5:
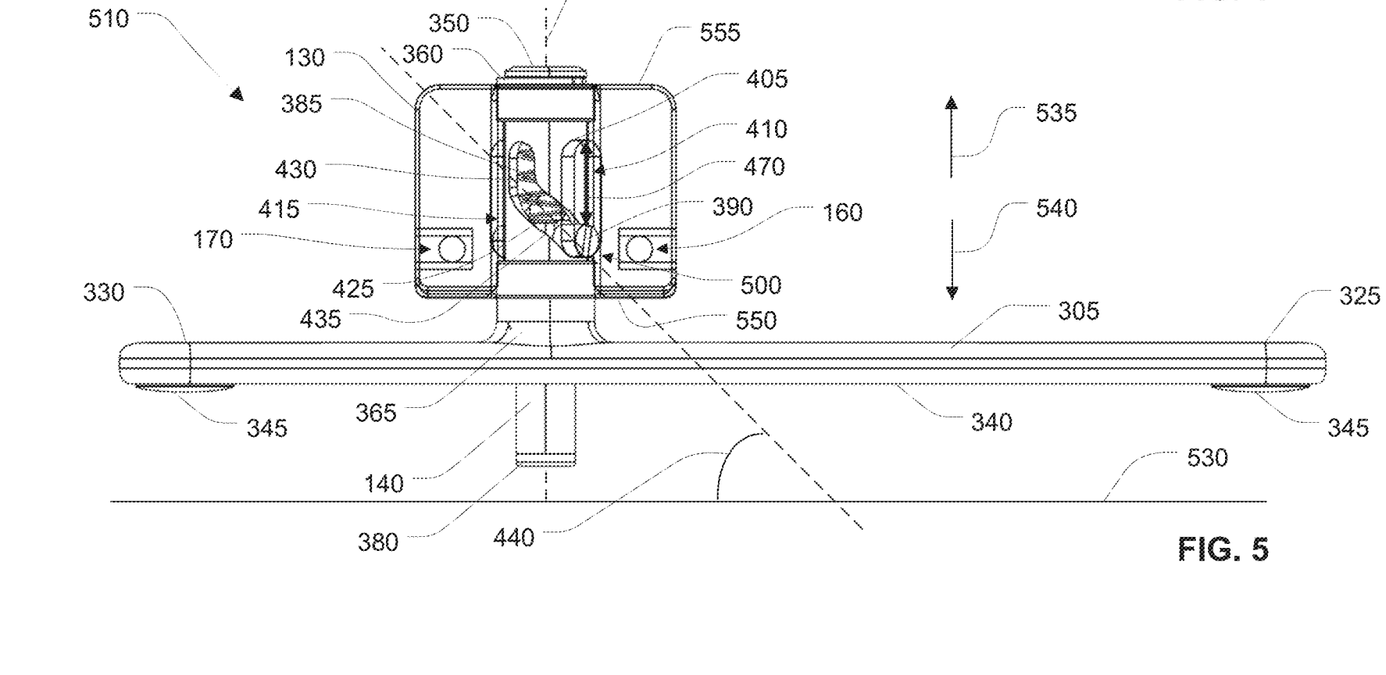
FIG. 5 is a front view of the self-deployable stand foot of FIG. 1 in a first position and a holder illustrated transparently.

As shown in FIG. 3, the foot shaft bore 315 of the foot 135 receives the activator 140 and the biasing member 385. One end of the biasing member 385 abuts with an upper wall 460 of the foot shaft bore 315 and the other end abuts an upper surface 465 of the activator 140. The biasing member 385 allows the activator 140 to be compressed and retracted along a vertical path 470, as shown in FIG. 5. In other words, the activator 140 can move up and down the vertical path 470 relative to the holder 130.

The holder guide path 290 and the foot guide path 320 includes cutouts that receives the engaging element 390. As shown in FIG. 2, the holder guide path 290 extends parallel to a longitudinal axis LO of the holder bore 150 defining vertical cutouts 405. The vertical cutouts 405 include a first vertical cutout 410 and a second vertical cutout 415 opposite of the first vertical cutout 410 relative to the longitudinal axis LO of the holder bore 150. The foot guide path 320 includes cam cutouts 425. The cam cutouts 425 include a first cutout portion 430 that is substantially parallel to a longitudinal axis LO of the foot shaft 310 and concentric to the holder bore 150, and a second cutout portion 435 that revolves at an angle 440 relative to the longitudinal axis LO of the foot shaft 310. Similar to the vertical cutouts 405, the cam cutouts 425 may include a first cam cutout 450 that is disposed opposite of a second cam cutout 455.

Figure 4:
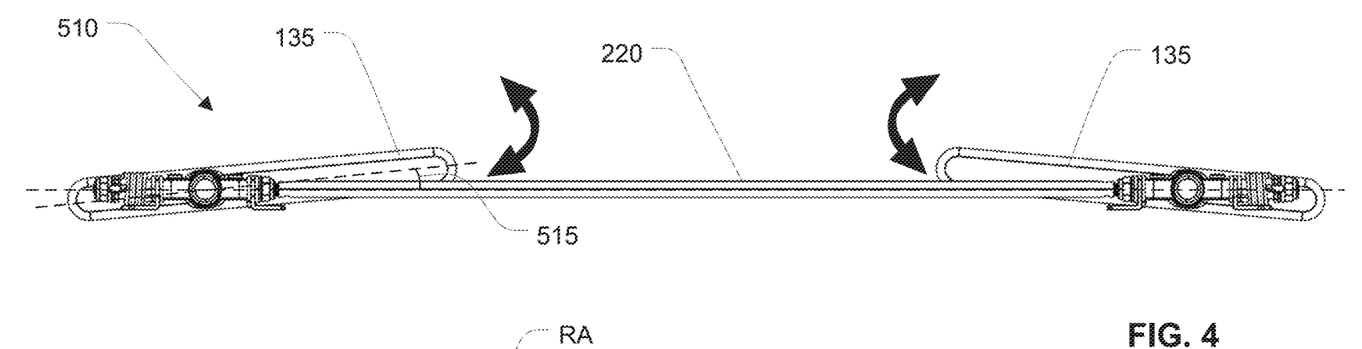
FIG. 4 is a top view of the self-deployable stand feet of FIG. 1 in a first position.

FIGS. 4 and 5 illustrates the stand mechanism 110 of a portable electronic device 100 with a mechanical linkage 500 in a first position 510 (a retracted or stored position). As illustrated in FIG. 4, the stand mechanism 110 includes a first deployable feet and a second deployable feet (hereinafter two feet) 135 that are disposed at opposite ends of the portable electronic device 100 and are connected by the torsion rod 220. The two feet 135 are tied together by the torsion rod 220 and the torsion rod 220 between the two feet 135 prevents the electronic device from warping. The torsion rod 22 also enables the entire portable electronic device 100 to coordinate rotation (e.g., tilt) with respect to both feet 135. In the first position 510, the two feet 135 are positioned substantially parallel to the torsion rod 220. In some examples, the two feet 135 can be positioned at an offset angle 515 relative to the torsion rod 220. For example, the offset angle can be between about 1 degree and about 10 degrees, or between about 4 degrees and about 6 degrees. In the illustrated configuration, the offset angle is about 5 degrees. In some embodiments, there may be no offset angle and the feet can be parallel with the torsion rod 220.

As shown in FIG. 5, the engaging element 390 is securely coupled to the activator 140 and forms a mechanical linkage 500 that transforms rotary motion into linear motion. The mechanical linkage 500 formed by the engaging element 390 is movable within both the holder guide path 290 and the foot guide path 320, as shown in FIG. 2. The engaging element 390 is received by both the holder guide path 290 and the foot guide path 320 such that the engaging element 390 moves simultaneously along the vertical cutouts 405 of the holder guide path 290 and the cam cutouts 425 of the foot guide path 320.

As also shown in FIGS. 4 and 5, when the feet 135 are in the first position 510, the activator 140 is displaced from the working surface 530 and the engaging element 390 is at a rest position. In the rest position, the activator 140 is pushed downward by the biasing member 385 which positions the engaging element 390 toward a lower end 550 of the holder 130. The activator 140 protrudes outwardly from the bottom surface 340 of the foot support 305.

Figures 6, 7:
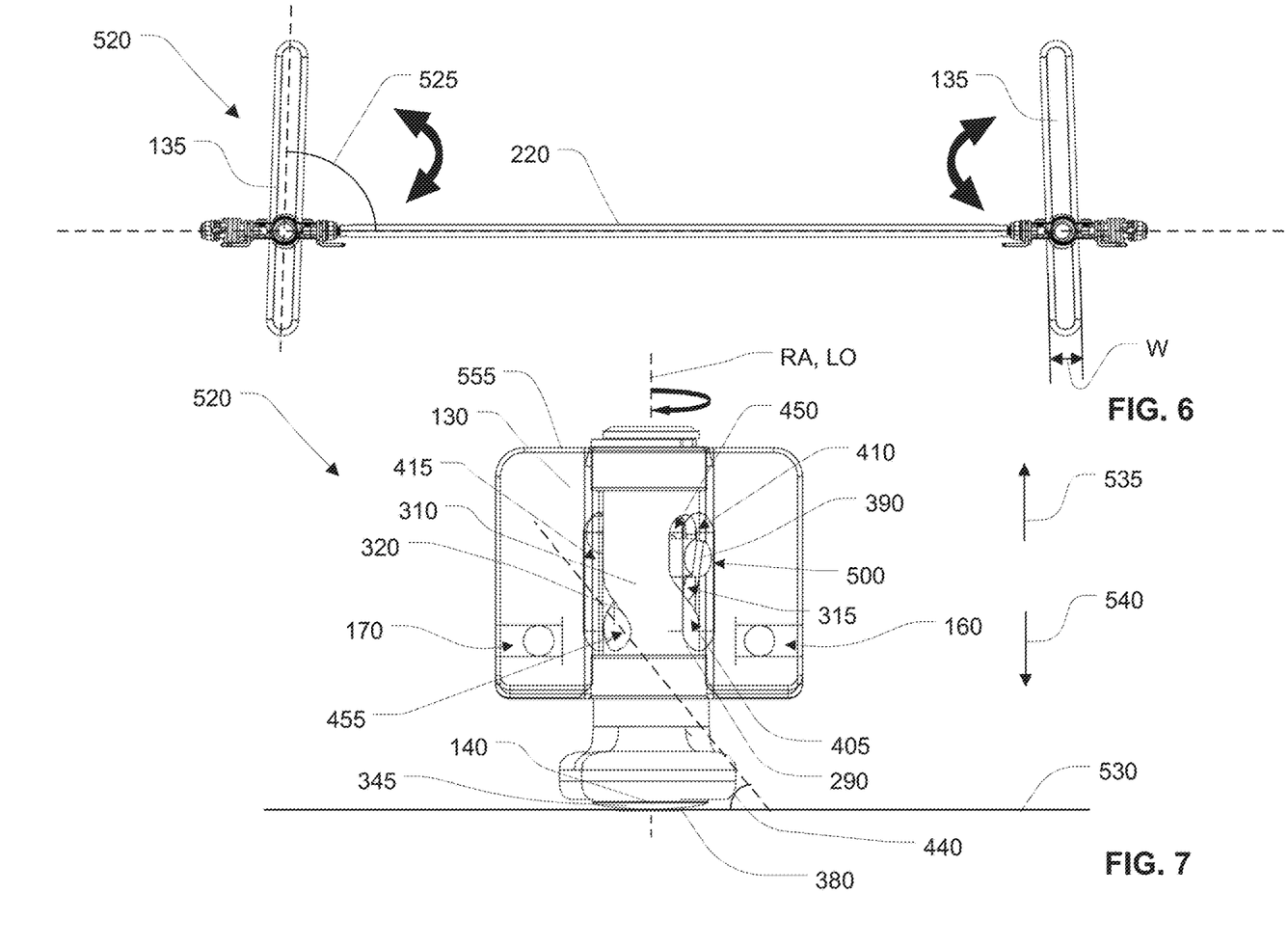
FIG. 6 is a top view of the self-deployable stand feet of FIG. 1 in a second position.
FIG. 7 is a front view of the self-deployable stand foot of FIG. 1 in a second position and the holder illustrated transparently.

FIGS. 6 and 7 illustrates the stand mechanism 110 of the portable electronic device in a second position 520 (a deployed position). In the second position 520, the two feet 135 of the stand mechanism 110 are approximately perpendicular to the torsion rod 220. In some examples, each of the two feet 135 can be positioned at a deployment angle 525 relative to the torsion rod 220. For example, the deployment angle 525 can be about 85 degrees, or about 80 degrees, or about 75 degrees. In some embodiments the deployment angle can be 90 degrees and the feet can be substantially parallel to each other. The range of the movement of the feet can be determined by the subtracting the offset angle from the deployment angle. In some embodiments, the range of movement of the feet can be between about 70 degrees and about 90 degrees. In the illustrated example, the range of movement of the feet is about 85 degrees.

As shown in FIGS. 6 and 7, as the activator 140 initiates contact with the working surface 530, the activator 140 is compressed into the foot shaft bore 315 by overcoming the force of the biasing member 385. The compression of the activator 140 moves the engaging element 390 toward an upper end 555 of the holder 130 in the upward direction 535 relative to the longitudinal axis LO along both of the guide paths 290, 320.

As shown in FIG. 7, the feet 135 are in a second position 520 and the activator 140 is in contact with the working surface 530. The engaging element 390 is disposed toward an upper end 555 of the holder 130. As the activator 140 is compressed into the foot shaft bore 315, the engaging element 390 moves up along the vertical cutouts 405 of the holder guide path 290, while driving the foot shaft 310 along the cam cutouts 450, 455 of the foot guide path 320. As the engaging element 390 drives the foot shaft 310 along the foot guide path 320, the foot shaft 310 rotates the foot support 305 from the first position 510 (i.e., a retracted or stored position) to the second position 520 (i.e., a deployed position). As a result, the activator pad 380 is substantially co-planar with the foot pad 345 when the foot support 305 is in the second position 520 (deployed position) and the activator 140 protrudes beyond the foot support 305 when the foot support 305 is in the first position 510 (stored position).

The transition between the first position 510 and the second position 520 of the stand mechanism 110 is enabled by self-deployment and self-retraction of the standing mechanism 110, which is achieved upon the activator 140 making or breaking contact with a working surface 530. In some embodiments, the feet 135 (e.g., self-deploying feet) may deploy simultaneously with the movement of the activator 140. In some examples, the process of self-deployment and self-retraction of the self-deploying feet 135 between the first position 510 and the second position 520 is provided by the interaction of the engaging element 390 within the holder guide path 290 and the foot guide path 320. Each of the vertical cutouts 405 of the holder guide path 290 receives a portion of the engaging element 390 and enables the engaging element 390 to move along the vertical cutout 405. Additionally, the engaging element 390 received by the holder guide path 290 is also received by the first and second cam cutouts 450, 455 of the foot guide path 320. Each of the first and second cam cutouts 450, 455 of the foot guide path 320 receives a portion of the engaging element 390 that enables the engaging element 390 to move along the first cutout portion 430 or the second cutout portion 435 of the foot guide path 320.

As shown in FIGS. 5 and 7, an angle 440 of the second cutout portion 435 revolving about the foot shaft 310 can control the angular rotation of the feet 135. Additionally, the angle 440 can change the speed at which the feet 135 deploy. For example, a flatter angle (e.g., below 10 degrees) would allow the feet 135 to deploy faster. A steeper angle (e.g., above 10 degrees) would allow the feet 135 to deploy slower. Furthermore, if the angle 440 is steep, more compression force of the activator 140 can be applied to rotate. If the angle is flatter, less compression of the activator 140 can be applied to rotate the feet 135. As such, every degree of vertical movement can be determined by millimeter of vertical rotation.

Movement of the activator 140 causes movement of the engaging element 390. When the activator 140 loses contact with the surface, the biasing member 385 moves the activator downward causing the engaging element 390 to move downward along the foot guide path 320. The movement of the engaging element 390 along the foot guide path 320 moves the foot support 305 from the deployed position (second position 520) at the deployment angle 525 with respect to the frame body 115 to the stored position (first position 510). As shown in FIG. 5, when the activator 140 breaks contact with the working surface 530, the biasing member 385 pushes the engaging element 390 in a downward direction 540 along the holder guide path 290. Simultaneously, the biasing member 385 pushes the engaging element 390 in a downward direction 540 along the foot guide path 320. In some examples, the engaging element 390 may move downward along the foot guide path 320 at an angle 440 defined by the second cutout portion 435. In other words, when the activator 140 is engaged with the surface, the activator 140 compresses the biasing member 385 causing the engagement element 390 to move toward a first end (e.g., opposite to the surface) of the holder 130 and the foot support 305 is in a deployed position.

Additionally and alternatively, when the activator 140 engages the surface, the activator 140 moves along the foot guide path 320 and moves upward along the holder guide path 290 rotating the foot shaft 310. As the activator 140 is compressed against the surface, the engaging element 390 moves along the foot guide path 320 and the activator 140 compresses the biasing member 385. The movement of the engaging element 390 along the foot guide path 320 moves the foot shaft 310 to rotate the foot support 305 from a stored position (first position 510) to a deployed position (second position 520). As shown in FIG. 7, when the activator 140 is compressed against the working surface 530, the biasing member 385 is compressed, and the activator 140 moves the engaging element 390 in an upward direction 535 along the holder guide path 290. Simultaneously, the activator 140 moves the engaging element 390 in the upward direction 535 along the foot guide path 320. In some examples, the engaging element 390 may move upward along the foot guide path 320 at an angle 440 (as shown in FIG. 5) defined by the second cutout portion 435. In other words, when the activator 140 disengages from the surface, the biasing member 385 biases the activator 140 causing the engaging element 390 to be positioned toward a second end (e.g., toward/adjacent to the surface) of the holder 130 and the foot support 305 is in the retracted position.

Figure 8:
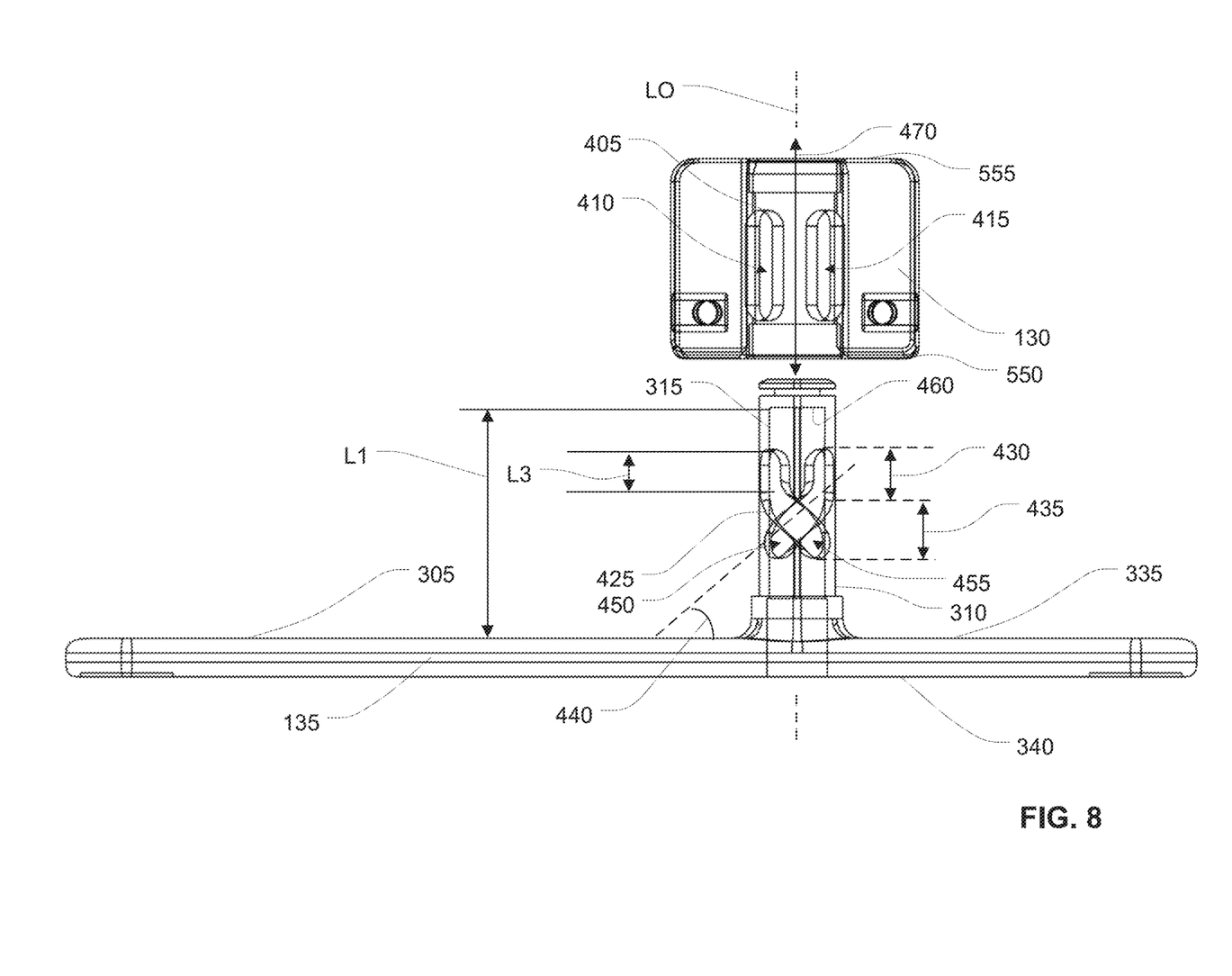
FIG. 8 is an exploded side elevation view of a holder and a foot of the self-deployable stand foot of FIG. 1.

Based on the linear motion (i.e., upward and downward movement) of the activator 140, the engaging element 390 interacts with the holder guide path 290 and the foot guide path 320 to provide a rotational motion of the foot 135 between the first position 510 and the second position 520. As shown in FIG. 8, the first and second vertical cutouts 410, 415 of the holder guide path 290 are opposite to each other with respect to the longitudinal axis LO of the holder bore 150. In addition, the first and second cam cutouts 450, 455 of the of the foot guide path 320 are mirror opposites of each other with respect to the longitudinal axis LO of the foot shaft bore 315. The holder guide path 290 in conjunction with the engaging element 390 coupled to the activator 140 provides a pivot point for the foot shaft 310 to rotate as the engaging element 390 moves along the foot guide path 320. More specifically, the first and second cam cutouts 450, 455 positioned in the mirror opposite configuration allow the foot shaft 310 to generate a twisting motion of the foot 135 as the engaging element 390 moves. In some examples, the second cutout portion 435 of the first and second cam cutouts 450, 455 can be helical.

In some examples, the direction the engaging element 390 rotates about the foot guide path 320 can change the rotation of the foot shaft 310. In order to make the foot support 305 swing in an outward direction, a first foot of the portable electronic device 100 may include an engaging element 390 that rotates in a counterclockwise direction along the foot guide path 320, and a second foot of the portable electronic device 100 may include an engaging element 390 that rotates in clockwise direction along the foot guide path 320.

In some applications, the feet can be locked in the second position. As shown in FIGS. 6 and 7, when the feet 135 are in the second position 520, the first cutout portion 430 extending vertically along the longitudinal axis LO provides the ability to lock rotation of the engaging element 390, and thus, lock the position of the feet 135. In some examples, at least one of the guide paths 290, 320 (e.g., holder guide path or foot guide path) may include an additional slot disposed at one end of the guide paths 290, 320 so that the feet 135 become locked in a deployed position.

In some applications, the working surface 530 may be irregular or uneven. As shown in FIG. 8, in order to accommodate for irregular working surfaces (e.g., carpet, bed spread, flooring thickness), a length L3 of the first cutout portion 430 of the cam cutouts 450, 455 can be extended along the longitudinal axis LO to further receive the activator 140 within the foot shaft bore 315. The vertically extending length L3 of the first cutout portion allows the engaging element to be vertically displaced at different heights along the longitudinal axis LO to compensate for uneven surfaces. For example, the additional length L3 of the first cutout portion 430 allows the activators 140 of different feet 135 to be retracted within the foot shaft bore 315 at different heights to provide stability. In some examples, the height (i.e., thickness) of the activator pad 380 can be different. For example, in order to prevent jamming of the activator 140, the length of the activator pad 380 can be increased. Alternatively, an elastomeric material of the activator pad 380 can compress along its height to accommodate for irregular or uneven surfaces.

Figure 9:
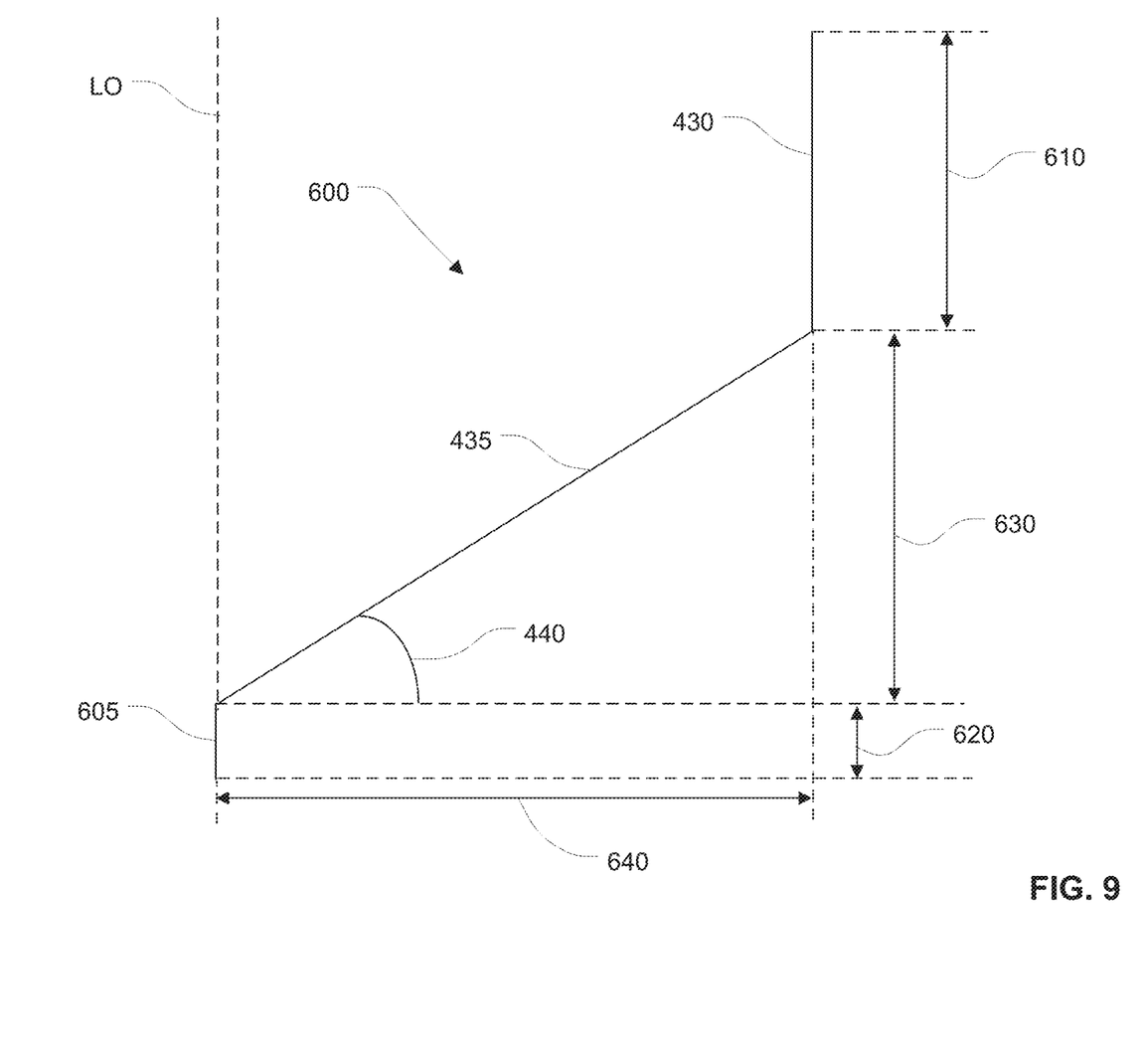
FIG. 9 is a schematic illustration of a cam cutout portion of FIG. 1 shown in a line diagram.

FIG. 9 illustrates a simplified path 600 of the cam cutouts 450, 455 laid out in a two-dimensional space. For example, a helix can be expressed with a diagonal line when a cylinder is flattened out. The simplified path 600 includes the first cutout portion 430, the second cutout portion and may include a third cutout portion 605. The first cutout portion 430 extends vertically and parallel with the longitudinal axis LO with a first vertical distance 610 and the third cutout portion 605 extends vertical and parallel with the longitudinal axis LO with a third vertical distance 620. The first cutout portion 430 is offset from the third cutout portion 605 by the second cutout portion 435 that extends diagonally at an angle relative to the longitudinal axis. The second cutout portion 435 includes a vertical length or a rise 630 and a horizontal length or a run 640. The angle 440 indicates a pitch of the second cutout portion 435. The pitch can be described as dividing the rise 630 by run 640 and can be expressed as:

$$\text{Pitch} = \tan(\text{angle}) = \frac{\text{rise}}{\text{run}}$$

Accordingly, the amount of angular rotation with respect to vertical displacement can be described by:

$$\text{Amount of angular rotation} = \tan^{-1}\left(\frac{\text{Vertical displacement}}{\text{Horizontal displacement}}\right)$$

The relationship of the amount of angular rotation of the engaging element 390 can be expressed by dividing the total vertical movement by the amount of angular rotation.

In some examples, as described above, the electronic device 100 may include a standing mechanism 110 including a single foot 135. The standing mechanism 110 may include similar components as shown in FIG. 2. For example, the standing mechanism 110 may include a holder 130 and a holder bore 150 that is configured to receive a foot shaft 310 of the foot 135. However, in order to provide stability, the shape of a foot support 305 can be different. For example, the shape of the foot support 310 may include a first end 325 and a second end such that the foot shaft 310 is disposed equidistant from both the first end 325 and the second end 330 of the foot support 305 according to the location of center of gravity of the portable electronic device 100.

In some examples, the holder may include multiple rotating elements. For example, the standing mechanism 110 may include a holder including one or more feet that rotates about the rotational axis RA. The holder can include a pair of vertical cutouts and a holder bore that is configured to receive a first foot shaft. The first foot shaft can include a first pair of cam cutouts and a first foot shaft bore that is configured to receive a second foot shaft. The second foot shaft can include a second pair of cam cutouts and a second foot shaft bore that is configured to receive an activator. An engaging element of the activator extends through the pair of vertical cutouts, the first pair of cam cutouts and the second pair of cam cutouts. The first pair of cam cutouts and the second pair of cam cutouts can be offset at a predetermined angle. Accordingly, the first foot shaft is coupled to a first foot support including a first end and a second end, and the second foot shaft is coupled to a second foot support including a third end and a fourth end respectively.

Similarly, when the activator engages a surface, the activator gets compressed into the second foot shaft bore causing the first foot shaft and the second foot shaft to rotate in opposite directions. For example, when the first foot shaft rotates in a clockwise direction, the second foot shaft will rotate in a counterclockwise direction. The rotation of the first foot shaft and the second foot shaft cause the first foot support and the second foot support to deploy in a cross-shaped position (e.g., cruciform, X-shaped) in order to provide stability. Alternatively, when the activator disengages from the surface, the activator gets pushed out from the second foot shaft bore, causing the first and second foot shafts to rotate and return to a retracted position.

In some examples, in addition to the second foot shaft described above, the holder may include a third foot shaft that is configured to be received by the second foot shaft bore and a third foot shaft bore that is configured to receive the activator. Accordingly, the third foot shaft includes a third foot support and third pair of cam cutouts. The first foot support, the second foot support, and the third foot support are configured to be deployed equidistant from one another (e.g., 120 degrees apart from each other) forming a three-legged stand when the standing mechanism 110 is in a deployed position. When the standing mechanism is in a retracted position, the first foot support, the second foot support and the third foot support can be positioned adjacent to each other.

While various spatial and directional terms, such as top, bottom, lower, mid, lateral, horizontal, vertical, front, and the like may be used to describe examples of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

The invention claimed is:

1. A portable electronic device comprising:
a frame body supporting electronic components; and
a stand mechanism including:
a foot including a foot support and a foot shaft including a foot guide path; and
an activator including an engaging element, the engaging element received by the foot guide path;
wherein a portion of the foot guide path extends at an angle relative to a longitudinal axis of the foot shaft,
wherein when the activator engages with a surface, the engaging element of the activator moves along the portion of the foot guide path at the angle relative to the longitudinal axis of the foot shaft causing the foot support to rotate from a stored position to a deployed position.

2. The portable electronic device of claim 1, wherein the stand mechanism further comprising a holder, wherein the holder includes at least one bushing, the at least one bushing receiving the foot shaft, the foot shaft rotating within the at least one bushing.

3. The portable electronic device of claim 2, wherein the holder includes a first counterbore and a second counterbore, the first counterbore receiving an upper bushing of the at least one bushing and the second counterbore receiving a lower bushing of the at least one bushing.

4. The portable electronic device of claim 1, wherein the stand mechanism further comprises a holder configured to receive the foot and a biasing member positioned in between the holder and the foot.

5. The portable electronic device of claim 4, wherein the activator being engaged with the surface moves the engaging element along the foot guide path and the activator compresses the biasing member.

6. The portable electronic device of claim 4, wherein when the activator disengages with the surface, the biasing member biases the activator to protrude from the foot causing the engaging element to move toward the foot support along the foot guide path; and
wherein movement of the engaging element along the foot guide path moves the foot support from the deployed position at a deployment angle with respect to the frame body to the stored position.

7. A stand mechanism comprising:
a pair of feet each including a foot guide path, the foot guide path including a first cutout portion, a second cutout portion, and a third cutout portion;
a pair of activators each including a biasing member and an engagement element; and
wherein when at least one of the pair of activators engages a surface, the respective engagement element of the respective activator moves from the third cutout portion toward the first cutout portion,
wherein when the at least one of the pair of activators disengages with the surface, the respective biasing member biases the respective activator by moving the respective engagement element from the first cutout portion toward the third cutout portion, and
wherein movement from the first cutout portion to the third cutout portion along the second cutout portion causes the respective foot to move between a stored position and a deployed position.

8. The stand mechanism of claim 7, further comprising a torsion rod, the torsion rod connected between the pair of holders and the pair of feet,
wherein when the pair of activators engages an even surface, the pair of feet synchronously rotates about a rotational axis from the stored position to the deployed position, and
wherein when the pair of activators loses contact with the even surface, the pair of feet synchronously rotates about the rotational axis from the deployed position to the stored position.

9. The stand mechanism of claim 7, wherein the foot at the deployed position includes a deployment angle, and wherein the deployment angle is 85 degrees.

10. The stand mechanism of claim 7, wherein the first cutout portion and the third cutout portion that is substantially parallel to a rotational axis and the second cutout portion that is angled relative to the rotational axis.

11. The stand mechanism of claim 10, wherein the second cutout portion is helical.

12. The stand mechanism of claim 10, wherein an angle of the second cutout portion is between 5 degrees and 45 degrees.

13. The stand mechanism of claim 7, wherein in the stored position, a portion of the activator protrudes from the foot, and
wherein in the deployed position, an end of the activator is aligned with respect to the foot.

14. A portable electronic device comprising:
a stand mechanism including:
a holder including vertical cutouts;
a self-deployable foot including a foot support and at least one cam cutout; and
an activator including an engaging element, the engaging element received by the vertical guide path and the at least one cam cutout,
wherein when the activator is engaged with a surface, the activator compresses a biasing member causing the engagement element to move toward a first end of the holder, wherein the foot support is in a deployed position when the engaging element is at the first end of the holder,
wherein when the activator is disengaged from the surface, the biasing member biases the activator causing the engaging element to be positioned toward a second end of the holder, wherein the foot support is in a retracted position when the engaging element is at the second end of the holder.

15. The portable electronic device of claim 14, wherein the foot support that includes a foot pad and the activator includes an activator pad, wherein the activator pad protrudes beyond the foot support when the foot support is in the retracted position, and wherein the activator pad is substantially co-planar with the foot pad when the foot support is in the deployed position.

16. The portable electronic device of claim 14, wherein the stand mechanism includes a first self-deployable foot and a second self-deployable foot.

17. The portable electronic device of claim 14, wherein the holder includes a first bracket and a second bracket, wherein the first bracket includes a first bore to receive a first screw coupled to a torsion rod, and the second bracket includes a second bore to receive a second screw coupled to a tilt spring, the torsion rod and the tilt spring allowing the portable electronic device to tilt forward and backward.

18. The portable electronic device of claim 17, wherein the torsion rod extends between the first self-deployable foot and the second self-deployable foot.

19. The portable electronic device of claim 14, and further comprising a mounting bracket with a first end coupled to the portable electronic device and a second end coupled to the stand mechanism.

20. The portable electronic device of claim 14, wherein the cam cutouts include a first cam cutout and a second cam cutout, the first cam cutout being a mirror opposite of the second cam cutout.

* * * * *